(12) United States Patent
Monti et al.

(10) Patent No.: US 8,762,633 B2
(45) Date of Patent: Jun. 24, 2014

(54) METHOD AND DEVICE FOR PERFORMING DIAGNOSTICS ON A MOTOR VEHICLE MANAGEMENT SYSTEM

(75) Inventors: Alessandro Monti, La Garenne-Colombes (FR); Arnaud Losq, Montigny-le-Bretonneux (FR); Eric Mounier, La Couture Boussey (FR)

(73) Assignee: Renault S.A.S., Boulogne-Billancourt (FR)

( * ) Notice: Subject to any disclaimer, the term of this patent is extended or adjusted under 35 U.S.C. 154(b) by 754 days.

(21) Appl. No.: 13/000,795

(22) PCT Filed: Jun. 12, 2009

(86) PCT No.: PCT/FR2009/051105
§ 371 (c)(1),
(2), (4) Date: Mar. 15, 2011

(87) PCT Pub. No.: WO2010/007270
PCT Pub. Date: Jan. 21, 2010

(65) Prior Publication Data
US 2011/0185115 A1   Jul. 28, 2011

(30) Foreign Application Priority Data
Jun. 24, 2008  (FR) ..................................... 08 54181

(51) Int. Cl.
*G06F 12/00*   (2006.01)
*G06F 13/00*   (2006.01)

(52) U.S. Cl.
USPC .................... 711/105; 711/150; 711/E12.044

(58) Field of Classification Search
None
See application file for complete search history.

(56) References Cited

U.S. PATENT DOCUMENTS

| 5,646,849 | A | 7/1997 | Walenty et al. |
| 6,434,082 | B1 * | 8/2002 | Hovis et al. ............... 365/233.16 |
| 6,452,865 | B1 * | 9/2002 | Wolford ................... 365/233.13 |
| 6,570,791 | B2 * | 5/2003 | Roohparvar et al. .... 365/185.33 |
| 2008/0263302 | A1 * | 10/2008 | Balluchi et al. ............... 711/167 |

FOREIGN PATENT DOCUMENTS

DE          43 40 027          6/1995

OTHER PUBLICATIONS

International Search Report issued Jun. 22, 2010 in PCT/FR09/051105 filed Jun. 12, 2009.

* cited by examiner

*Primary Examiner* — Sean D Rossiter
(74) *Attorney, Agent, or Firm* — Oblon, Spivak, McClelland, Maier & Neustadt, L.L.P.

(57) ABSTRACT

A device for recording data emitted from a motor vehicle management system, including a volatile memory, a non-volatile memory, and a data recording module configured to receive a signal concerning activation status emitted by the management system and to record the data in a first zone of the volatile memory on a rising edge of the activation status signal and in a second zone of the volatile memory on a falling edge of the activation status signal, and including a record management module configured to receive the activation status signal and to activate a command to record on a falling edge with the activation status signal, the recording module being further configured to receive the record command and to record the content of the two zones of the volatile memory into a zone of the non-volatile memory when the record command is activated.

8 Claims, 4 Drawing Sheets

METHOD AND DEVICE FOR PERFORMING DIAGNOSTICS ON A MOTOR VEHICLE MANAGEMENT SYSTEM

The invention relates to a method and a device for performing diagnostics for a motor vehicle control system.

More particularly, the invention relates to an assisted parking brake system.

Currently certain motor vehicles are equipped with an assisted parking brake system which consists in managing in an automatic manner a parking brake according to the situation of the motor vehicle. Such a system makes it possible to manage in an automatic manner the following situations;

assistance with starting, the principle of which is to release the brakes on the non-driven wheels as soon as the torque transmitted by the engine is sufficient to compensate for the effect of the slope;

automatic engagement, the principle of which is to automatically engage the parking brake when an intentional request to stop the engine is made by the driver;

dynamic braking, the principle of which is to brake the vehicle without locking the wheels while adhering to a given deceleration with the parking brake alone.

Assisted management of the parking brake is complex and must take into account all the situations of use, and particularly poor use of the system by the driver. For example, when the driver opens the door of the vehicle while the engine is running and the parking brake has not been manually engaged, the system triggers in this case an alert since the vehicle is not immobilized. Moreover, in the situation where the engine stalls, where the parking brake is not engaged and the driver opens the door, an alert signal is generated to indicate to the driver that the parking brake is not engaged.

In certain situations, the assisted parking brake system may not be used correctly by the driver, for example when the driver ignores the alert signals, and this may lead to dangerous situations. There therefore exists a requirement to diagnose the critical situations so as to determine the causes thereof and with the aim of being able to affirm or deny poor use of the system by the driver.

Furthermore, in case of accident it is difficult to ascertain the time that has elapsed between the generation of an alert signal and the parking brake engagement request made by the driver. Indeed, currently most motor vehicles are not furnished with means for dating the information which flows around the electronic control units.

It is possible to cite, for example, British patent application GB 2 376 990 which describes a parking brake control system in which the parking brake is released when the vehicle is moving with a positive displacement and the clutch pedal reaches a satisfactory position, but this document does not describe a procedure for performing diagnostics on an assisted parking brake system.

It is possible to also cite British patent application GB 2 342 967 which discloses a parking brake control device in which said brake is released when the brake torque applied to the wheels is less than a certain threshold. Moreover, it is possible to cite French patent application FR 2 828 450 filed in the name of the applicant which describes a device for assisting hill starts and French patent application FR 2 841 199, also filed in the name of the applicant, which discloses an automatic device for disengaging the parking brake on starting. But neither do these documents disclose a means of diagnosing the operation of an assisted parking brake system.

One of the aims of the invention is therefore to provide a device and a method for diagnosing the operation of a system for general control of a motor vehicle subsequent to an alert signal emitted by said system, but also when there is no upload of defect.

The device and the method proposed will be particularly adapted for diagnosing an assisted parking brake system of a motor vehicle.

Another aim of the invention is to provide a simple and inexpensive means for establishing the time that passes between the generation of an alert signal and the reaction of the driver.

In one embodiment, a device for recording the data emitted from a motor vehicle control system, comprising a volatile memory, a nonvolatile memory and a data recording module, able to receive an activation state signal emitted by the control system and which is able to record the data in a first area of the volatile memory on a rising edge of the activation state signal and in a second area of the volatile memory on a falling edge of the activation state signal.

The device furthermore comprises a module for managing the recordings which is able to receive the activation state signal and which is able to activate a recording command on a falling edge of the activation state signal. The recording module is moreover able to receive the recording command and able to record the content of the two areas of the volatile memory in an area of the nonvolatile memory when the recording command is activated.

Such a device comprises a memory of volatile type and a memory of nonvolatile type. The memory of volatile type comprises two areas for recording data. Moreover, the memory of nonvolatile type can comprise a plurality of memory areas so as to keep each recording in a distinct area. Indeed, the phrase "record data in an area of the nonvolatile memory" is intended to mean a recording of the data in an area of the nonvolatile memory which is different at each new recording. There will therefore be as many areas used of the nonvolatile memory as events triggering a recording of data.

The memory of nonvolatile type may be for example a memory of EEPROM type or "Electrically Erasable Programmable Read Only Memory".

By virtue of the recording of the data of a control system in two distinct areas of the volatile memory before and after the activation of the system it is possible to provide a means for diagnosing the operation of the system when there is no upload of defect. Indeed, by comparing the two distinct states of the data it is possible to follow the evolution of the system. By saving the content of the two areas of the volatile memory in an area of the memory of nonvolatile type it is possible to defer the analysis of the data.

According to another embodiment, the module for recording the data and the module for managing the recordings are able to receive an alert signal emitted by the control system. The module for recording the data is able to record the data in the first area of the volatile memory on a rising edge of the alert signal. The module for managing the recordings is able to activate the recording command on a rising edge of the alert signal.

In the situation where an alert signal is generated, the data are saved in a first area of the volatile memory, and then the content of this area of the volatile memory is saved in an area of the nonvolatile memory. Thus it is possible to preserve the context of triggering of the alert signal.

According to yet another embodiment, the device comprises a module for managing a counter able to increment a counter on a rising edge of the alert signal and which is able to transmit the current value of the counter to the module for recording the data. The recording module is able to record the current value of the counter in an area of the volatile memory.

With the aid of the incrementation of a counter, a simple means of dating the recordings is provided without having to use, for example, a date-stamping protocol for the data which is more complex and more expensive to carry out.

According to another embodiment, the device comprises a module for recording the counter able to record the current value of the counter in an area of the nonvolatile memory on a rising edge of a place on standby command emitted by the control system, and which is able to transmit the recorded value of the counter to the module for managing the counter on a rising edge of a command to resume by the control system.

In certain situations, it may be necessary to wait a certain time between the generation of an alert signal and the reaction of the driver. For example when the driver stops the engine and leaves his vehicle while the parking brake is not engaged. Thus, to avoid undue electrical consumption, it is possible to request that said device be placed on standby without losing the value of the counter.

According to yet another embodiment, the module for managing the recordings is able to compare the current value of the counter with a maximum counter threshold, and which is able to activate the recording command and to activate a command for recording the saturated counter if the counter is strictly greater than the maximum counter threshold, the module for recording the data being able to receive the command for recording the saturated counter and which is able to record the current value of the counter and the data in the first area of the volatile memory when the command for recording the saturated counter is activated.

To economize on memory space, it is possible to use a counter which possesses a maximum size. The device therefore makes it possible to manage this size constraint on the counter by being equipped with a means which manages the counter when the latter reaches this maximum size, that is to say when the counter is saturated.

According to another aspect, a method is proposed for recording the data emitted from a motor vehicle control system, comprising a volatile memory and a nonvolatile memory, generating at least one activation state signal. According to this method the data are recorded in a first area of the volatile memory when the activation state signal is activated and in a second area of the volatile memory when the activation state signal is deactivated.

The content of the two areas of the volatile memory is thereafter recorded in an area of the nonvolatile memory when the activation state signal is deactivated.

According to another mode of implementation, in which the control system generates at least one alert signal, the data are recorded in the first area of the volatile memory when the alert signal is activated, and then the content of the two areas of the volatile memory is recorded in an area of the nonvolatile memory.

According to yet another mode of implementation, a counter is incremented when the alert signal is activated, and the data and the counter are recorded in the first area of the volatile memory when the activation state signal is activated.

According to another mode of implementation, in which the control system generates a standby command and a resumption command, the current value of the counter is recorded in an area of the nonvolatile memory when the standby command is activated, and the counter is initialized by the recorded current value of the counter when the resumption command is activated.

According to yet another mode of implementation, the current value of the counter is compared with a maximum counter threshold, and when the counter is strictly greater than the maximum counter threshold, the data and the counter are recorded in the first area of the volatile memory, and then the content of the two areas of the volatile memory is recorded in an area of the nonvolatile memory.

Other aims, characteristics and advantages of the invention will become apparent on reading the following description, given solely by way of nonlimiting example, and with reference to the appended drawings in which.

Figure 1:
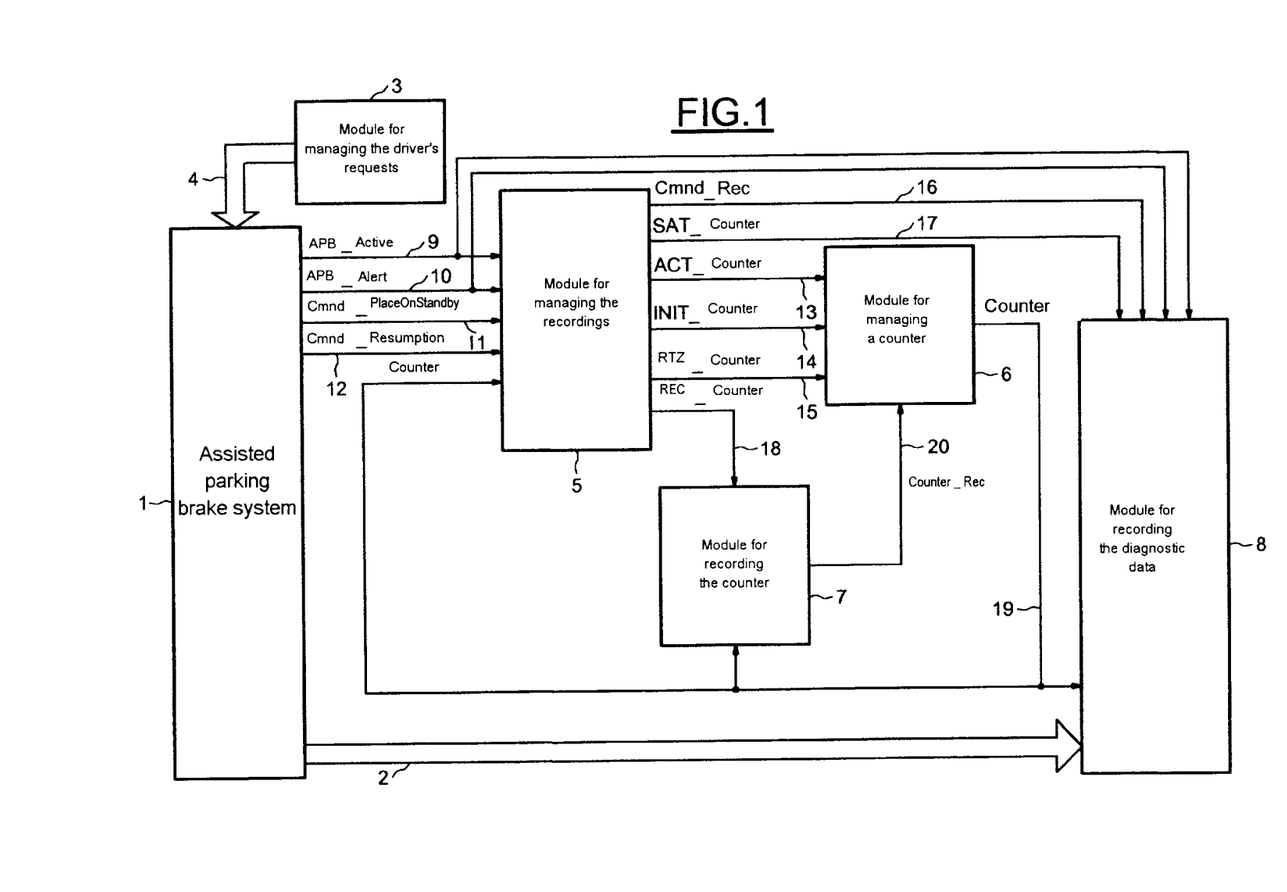
FIG. 1 is a schematic view of a device for recording the data emitted from a motor vehicle control system.

In FIG. 1 a schematic view of a device for recording the data emitted from a motor vehicle control system has been represented. In the embodiment described, the control system is an assisted parking brake system 1. The assisted parking brake system 1, also denoted by APB system, is able to emit diagnostic data on a communication network 2.

These diagnostic data may be, for example:
the distance traveled by the vehicle during recording;
the speed of the vehicle at the moment of recording;
the state of the parking brake at the start and at the end of the engagement or disengagement operation;
the measurement or the estimation of the force of engagement of the parking brake at the start and at the end of the operation;
the event which has triggered a recording.

It may be beneficial to record other diagnostic data, however, the only limitation is related to the size of the available nonvolatile memory.

The APB system receives brake engagement and disengagement requests, transmitted by a connection 4, from a module 3 for managing the requests of the driver.

The device for recording the data comprises a module 5 for managing the recordings, a module 6 for managing a counter, a module 7 for recording the counter and a module 8 for recording the diagnostic data. The general principle of the recording of the data consists in detecting an activation or alert signal emitted from the APB system, to manage a counter when at least one alert signal is emitted, so as to be able to determine the elapsed time between the generation of an alert and the response to this alert, and then to perform recordings at the start and at the end of an operation of the APB system so as to diagnose the operation of the APB system. Furthermore a recording is systematically performed when an alert signal is generated with the aim of recording the operating context of the APB system at the moment of the alert.

The parking brake system 1 furthermore emits signals APB_Active, APB_Alert, Cmnd_PlaceOnStandby and Cmnd_Resumption, transmitted respectively by the connections 9 to 12, to the module 5 for managing the recordings.

the activation state signal APB_Active is a Boolean signal which equals:
0 if the APB system is not active, or when a parking brake engagement or disengagement operation has terminated;
1 if the APB system is active, that is to say when a parking brake engagement or disengagement operation is in progress;
the APB_Alert alert signal is a Boolean signal which equals:
0 if the APB system does not generate any alert
1 if the APB system generates an alert;

the command Cmnd_PlaceOnStandby for placement on standby is a Boolean signal which equals:
0 if the APB system does not command placement on standby of the recording device
1 if the APB system commands placement on standby of the recording device;
the Cmnd_Resumption resumption command is a Boolean signal which equals:
0 if the APB system does not command any resumption of the recording device
1 if the APB system commands a resumption of the recording device.

The device for recording the diagnostic data manages the recording of the diagnostic data as a function of the value of the signals emitted by the assisted parking brake system 1.

Recording of the diagnostic data is triggered during the following activation events:
assisted engagement of the parking brake activated upon stopping the engine;
assisted disengagement of the parking brake activated upon starting the vehicle;
request of the driver for engagement of the parking brake when the vehicle has stopped or when the vehicle is in motion;
request of the driver for a disengagement of the parking brake.

When one of the previous activation events occurs, the activation state signal APB_Active equals 1 and signifies that the assisted parking brake system 1 is activated.

Recording of the diagnostic data is also triggered during the following alert events:
alert when the parking brake is not engaged and the driver's door opens;
alert when the parking brake is engaged and the vehicle is in motion;
alert when an accident is detected, for example on the activation of the airbags.

When one of the previous alert events occurs, the APB_Alert alert signal equals 1 and signifies that a dangerous situation has been detected by the assisted parking brake system 1.

Recording of the diagnostic data is also triggered when the counter saturates, that is to say it reaches a maximum counter threshold CounterMax. The "saturated counter" event does not trigger any alert, but advises of a dangerous situation which manifests a late or absent reaction, on the part of the driver, to an alert message.

The module 5 for managing the recordings manages the activation state signal APB_Active, the APB_Alert alert signal and the other signals Cmnd_PlaceOnStandby and Cmnd_Resumption emitted by the assisted parking brake system 1. Said signals are considered to be input signals of said module 5. Furthermore, this module 5 for managing the recordings controls the management of a counter and controls the saving of said counter and of the diagnostic data.

The module 5 for managing the recordings emits several output signals to control the other modules 6, 7 and 8 of the recording device. The output signals ACT_Counter, INIT_Counter and RTZ_Counter are transmitted respectively by the connections 13 to 15, to the module 6 for managing the counter.
the ACT_Counter signal for commanding activation of the counter is a Boolean signal which equals:
0 to command a deactivation of the counter
1 to command an activation of the counter, that is to say to command an incrementation of the counter;
the INIT_Counter signal for commanding initialization of the counter is a Boolean signal which equals:
0 not to command an initialization of the counter
1 to command an initialization of the counter;
the RTZ_Counter signal for commanding resetting to zero of the counter is a Boolean signal which equals:
0 not to command a reset to zero of the counter
1 to command a reset to zero of the counter.

The module 5 for managing the recordings also emits the output signals Cmnd_Rec and SAT_Counter, transmitted respectively by the connections 16 and 17, to the module 8 for recording the diagnostic data.
the recording command signal Cmnd_Rec is a Boolean signal which equals:
0 if the recording command is deactivated
1 if the recording command is activated;
the SAT_Counter signal for commanding recording of the saturated counter is a Boolean signal which equals:
0 if the command for recording the saturated counter is deactivated
1 if the command for recording the saturated counter is activated.

Furthermore, the module 5 for managing the recordings emits another output signal REC_Counter, transmitted by a connection 18, to the module 7 for recording the counter.
the REC_Counter command signal is a Boolean signal which equals:
0 if there is no request for recording the value of the counter in an area of the nonvolatile memory
1 if there is a request for recording the value of the counter in an area of the nonvolatile memory.

The module 7 for recording the counter records the value of the counter Counter in an area of the nonvolatile memory dedicated to the counter.

The module 7 for recording the counter is also able to emit a recorded value Counter_Rec of the counter, transmitted by a connection 20, to the module 6 for managing the counter. The recorded value Counter_Rec of the counter represents the value of the counter Counter which is recorded in the area dedicated to the counter.

The module 6 for managing a counter manages the counter Counter so as to provide a simple means for dating the diagnostic data recorded by the recording module 8. The recording of the counter makes it possible to estimate the time which has elapsed between the generation of an alert and the reaction of the driver, or of the parking brake system, that is to say a request to engage or disengage said parking brake.

The module 6 for managing the counter makes it possible to activate, to initialize or to reset to zero the counter as a function of the command signals emitted by the module 5 for managing the recordings. For example, it is possible to manage the counter in the following manner:
if the RTZ_Counter signal for commanding resetting to zero of the counter equals 1, the signal Counter is modified to the zero value;
if the ACT_Counter signal for commanding activation of the counter equals 1, the Counter signal is incremented;
if the INIT_Counter signal for commanding initialization of the counter equals 1, the Counter signal is assigned the counter value Counter_Rec recorded in the area of the nonvolatile memory dedicated to the counter.

The module 6 for managing the counter emits the value of the counter Counter, transmitted by a connection 19, to the module 8 for recording the data, to the module 7 for recording the counter and to the module 5 for managing the recordings.

The module 8 for recording the diagnostic data records the diagnostic data as well as the value of the counter Counter in the areas of the volatile memory and when it is necessary to preserve these data, this module 8 is able to record the content of the areas of the volatile memory in an area of the nonvolatile memory, and is also able to record the counter in a dedicated area of the nonvolatile memory.

The module 8 for recording the data receives the signals APB_Active and APB_Alert, transmitted respectively by the connections 9 and 10, from the APB system; the signals Cmnd_Rec and SAT_Counter, transmitted respectively by the connections 16 and 17, from the module 5 for managing the recordings; the counter Counter transmitted by the connection 19 from the module 6 for managing the counter and the diagnostic data, transmitted by the communication network 2, from the APB system.

Figure 2:
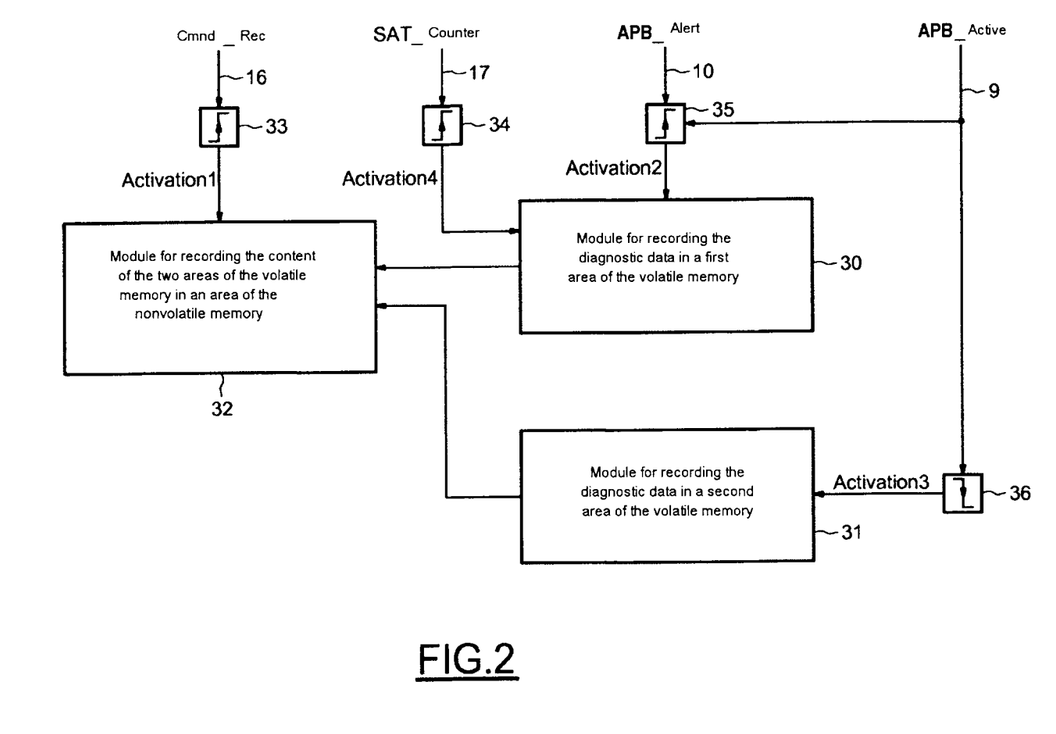
FIG. 2 is a schematic view of an embodiment of a module for recording the data.

In FIG. 2 has been represented a schematic view of an embodiment of the module 8 for recording the diagnostic data.

The module 8 for recording the diagnostic data comprises two modules 30, 31 for managing the recordings of the diagnostic data. The module 30 manages the recording of the diagnostic data in a first area of the volatile memory. The module 31 manages the recording of the diagnostic data in a second area of the volatile memory. Said recording module 8 also comprises a module 32 for recording the content of the two areas of the volatile memory in an area of the nonvolatile memory. Furthermore, said recording module 8 comprises a means 33 for detecting a rising edge of the recording command signal Cmnd_Rec, a means 34 for detecting a rising edge of the SAT_Counter signal for commanding recording of the saturated counter and a means 35 for detecting a rising edge of the APB_Alert alert signal and a rising edge of the activation state signal APB_Active. The module 8 for recording the diagnostic data also comprises a means 36 for detecting a falling edge of the activation state signal APB_Active.

When the means 35 detects a rising edge of the activation state signal APB_Active or a rising edge of the APB_Alert alert signal, it activates a signal Activation2 to command the recording module 30 to record the diagnostic data and the counter in the first area of the volatile memory.

When the means 34 detects a rising edge of the SAT_Counter signal for commanding recording of the saturated counter, it activates a signal Activation4 to command the recording module 30 to record the diagnostic data and the counter in the first area of the volatile memory.

When the means 36 detects a falling edge of the activation state signal APB_Active, it activates a signal Activation3 to command the recording module 31 to record the diagnostic data and the counter in the second area of the volatile memory.

When the means 33 detects a rising edge of the recording command signal Cmnd_Rec, it activates a signal Activation1 to command the recording module 32 to record the content of the two areas of the volatile memory in an area of the nonvolatile memory.

The device for recording the data may be implemented in an electronic control unit in the form of an electronic device, or in software form; it can also be embedded in software form aboard a programmable automaton.

Figure 3A:
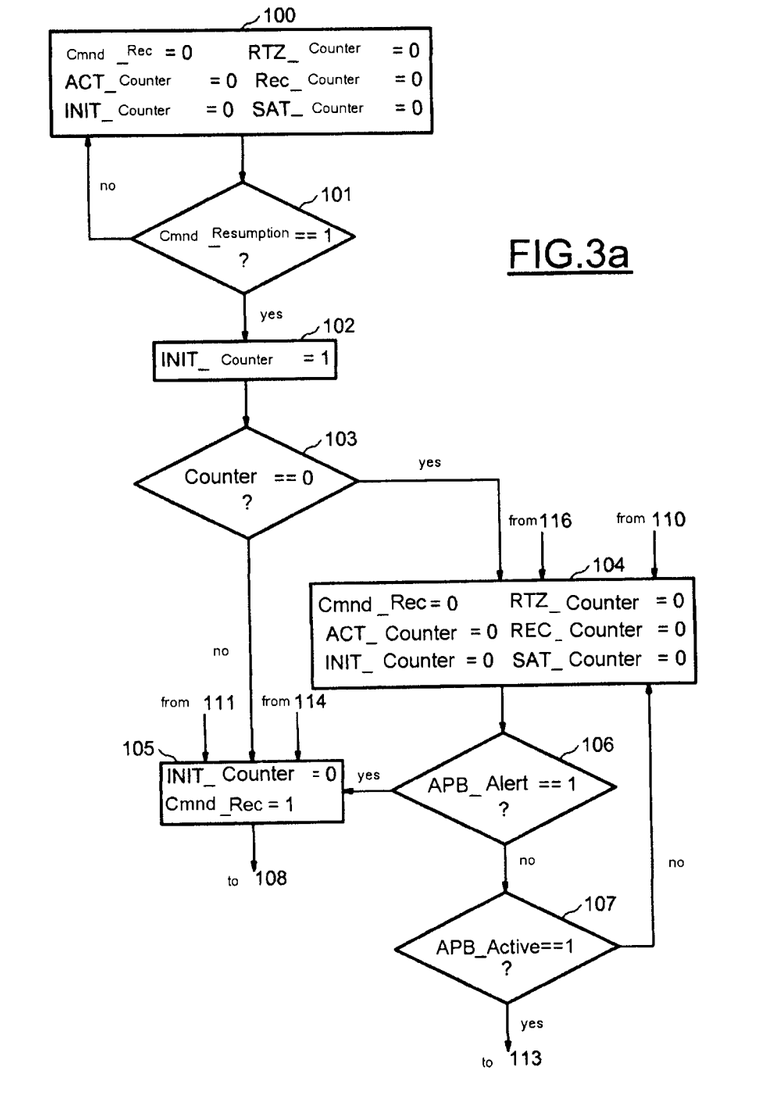
FIGS. 3a, 3b illustrate the main phases of a method for recording the data emitted from a motor vehicle control system.
Figure 3B:
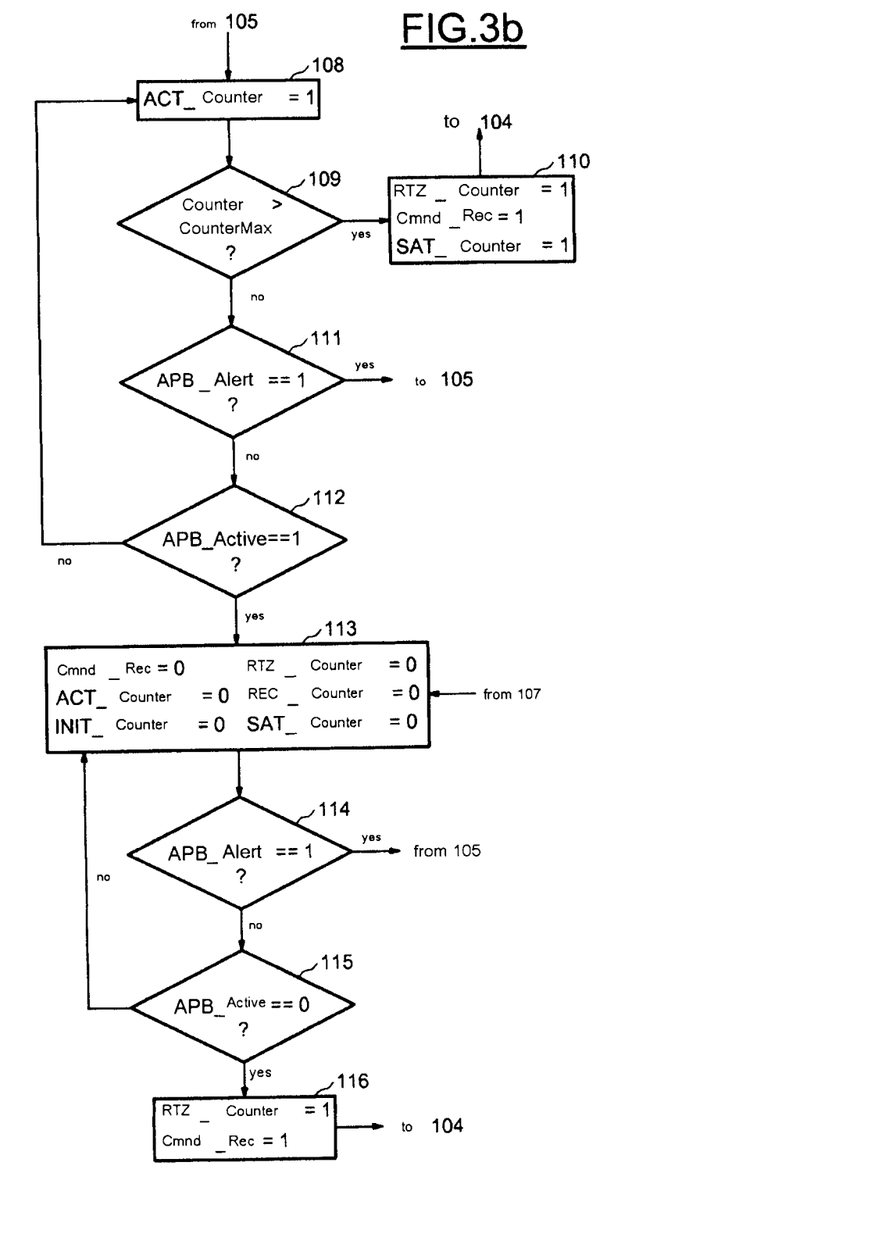

In FIGS. 3a and 3b has been represented a flowchart illustrating the main phases of a method for recording the data emitted from a motor vehicle control system.

The general principle of the method for recording the data consists in detecting variations of the activation state and alert signals emitted by the APB system, and following the rising edge and falling edge transition of said signals, recordings of the diagnostic data and of a counter are undertaken.

When the APB system performs an engagement or disengagement operation, the diagnostic data and the counter are recorded in a first area of a volatile memory and then the end of the operation is awaited. This first recording makes it possible to save the data at the start of the operation.

When the operation has terminated, the diagnostic data and the counter are recorded in a second area of the volatile memory, and then the content of the two areas of the volatile memory is recorded in an area of a nonvolatile memory. This second recording makes it possible to save the data at the end of the operation.

By virtue of a comparison of the data recorded at the start and at the end of the operation it will be possible to diagnose the operation of the APB system in the absence of alert signals.

When the APB system generates an alert signal, the diagnostic data and the counter are recorded in the first area of the volatile memory and then the content of the two areas of the volatile memory is recorded in an area of the nonvolatile memory. The recording of the data in the nonvolatile memory makes it possible to preserve the context which triggered an alert signal. Moreover, the incrementation of a counter is triggered and it is awaited for the APB system to perform an engagement or disengagement operation, either on the driver's request in response to the alert signal, or automatically if the APB system can automatically correct the defect in progress.

When the APB system performs the engagement or disengagement operation in response to the alert signal, the incrementation of the counter is stopped and the data are recorded.

The method begins with an initialization step 100. In this initialization step, the output signals of the recordings management module 5 described in the previous FIG. 1 are initialized to the zero value.

After this initialization step 100, a comparison step 101 is performed in which the value of the Cmnd_Resumption resumption command is tested. If the APB system commands a resumption of the recording device (Cmnd_Resumption equals 1), a step 102 of restoring the counter is performed; in the converse case the initialization step 100 is performed again.

In step 102 of restoring the counter, the INIT_Counter signal for commanding initialization of the counter is modified to the value 1 (INIT_Counter equals 1), so as to restore the value of the counter by assigning to the current Counter value of the counter the value Counter_Rec recorded in an area, of the nonvolatile memory, dedicated to the counter.

After this restoring step 102, a comparison step 103 is performed in which the value of the counter Counter is tested. If the thus restored value of the counter is zero (Counter equals 0), a step 104 of waiting for an event triggering a recording is performed; in the converse case a step 105 of recording the alert context is performed.

In the step 104 of waiting for an event triggering a recording, the output signals of the module 5 for managing the recordings is reinitialized to the zero value.

After this step 104 of waiting for an event triggering a recording, a comparison step 106 is performed in which the value of the APB_Alert alert signal is tested. If the APB system generates an alert (APB_Alert equals 1), step 105 of recording the alert context is performed; in the converse case another comparison step 107 is performed.

In the comparison step 107, the value of the activation state signal APB_Active is tested. If the APB system is active (APB_Active equals 1), step 113 of waiting for the end of operation of the APB system is performed; in the converse case the step 104 of waiting for an event triggering a recording is performed again.

In step 105 of recording the alert context, the signal INIT_Counter for commanding initialization of the counter is modified to the value 0 (INIT_Counter equals 0) and the recording command signal Cmnd_Rec is modified to the value 1 (Cmnd_Rec equals 1). The activation of the recording command Cmnd_Rec will trigger the recording of the content of the two areas of the volatile memory in an area of the nonvolatile memory.

After step 105 of recording the alert context, a step 108 of activating the counter is performed in which the ACT_Counter signal for activating the counter is modified to the value 1 (ACT_Counter equals 1), thereby triggering the incrementation of the counter Counter.

After this step 108 of activating the counter, a comparison step 109 is performed in which the value of the counter Counter is tested. If the current value of the counter is strictly greater than the threshold CounterMax, which is the counter saturation limit, (Counter>CounterMax), a step 110 of desaturating the counter is performed; in the converse case another comparison step 111 is performed.

In step 110 of desaturating the counter, the SAT_Counter signal is modified to the value 1, and then the signals RTZ_Counter, Cmnd_Rec are modified to the value 1. The activation of the SAT_Counter signal for commanding recording of the saturated counter gives rise to a saving of the diagnostic data and of the counter in the first area of the volatile memory. The effect of the activation of the signal RTZ_Counter for commanding setting to zero of the counter is to desaturate the counter Counter by reinitializing it to the value 0, and the activation of the recording command Cmnd_Rec gives rise to a saving of the content of said nonvolatile memory in an area of the nonvolatile memory.

After this step 110 of desaturating the counter, the step 104 of waiting for an event triggering a recording is performed again.

In the comparison step 111, the value of the APB_Alert alert signal is tested. If the APB system generates an alert (APB_Alert equals 1), step 105 of recording the alert context is performed; in the converse case another comparison step 112 is performed.

In the comparison step 112, the value of the activation state signal APB_Active is tested. If the APB system is active (APB_Active equals 1), the step 113 of waiting for the end of operation of the APB system is performed; in the converse case step 108 of activating the counter is performed again.

In the step 113 of waiting for the end of operation of the APB system, the output signals of the module 5 for managing the recordings is initialized to the zero value. When the counter is deactivated (ACT_Counter equals 0), the incrementation of the counter Counter is stopped.

After this step 113 of waiting for the end of operation of the APB system, a comparison step 114 is performed in which the value of the APB_Alert alert signal is tested. If the APB system generates an alert (APB_Alert equals 1), step 105 of recording the alert context is performed; in the converse case another comparison step 115 is performed.

In the comparison step 115, the value of the activation state signal APB_Active is tested. If the APB system is not active (APB_Active equals 0), that is to say if the parking brake engagement or disengagement operation has terminated, a step 116 of recording the operating contexts of the APB system is performed, in the converse case the step 113 of waiting for the end of operation of the APB system is performed again.

In step 116 of recording the operating contexts of the APB system, the RTZ_Counter signal for commanding resetting to zero of the counter is modified to the value 1 (RTZ_Counter equals 1) and the recording command signal Cmnd_Rec is modified to the value 1 (Cmnd_Rec equals 1).

After step 116 of recording the operating contexts of the APB system, the step 104 of waiting for an event triggering a recording is performed again.

It will be noted that at any moment, during the execution of the recording method, it is possible to test the value of the place on standby command Cmnd_PlaceOnStandby. If the APB system commands placement on standby of the recording device (Cmnd_PlaceOnStandby equals 1), the REC_Counter signal is modified to the value 1 so as to preserve the current value of the counter in the area of the nonvolatile memory dedicated to the counter and the initialization step 100 is performed.

It will be noted that the APB_Active signal is a held signal, that is to say as long as the assisted parking brake system 1 is activated, the signal APB_Active equals 1.

It will be noted that the APB_Alert signal is a non-held signal, that is to say when an alert event is detected by the assisted parking brake system 1, the APB_Alert equals 1 to signal the alert, and then resumes the value 0 instantaneously.

The steps of the recording method may be implemented by an electronic circuit, or in software form, or in a programmable automaton, implemented in the module 5 for managing the recordings.

By virtue of the recording of the state of the parking brake at the start and at the end of the engagement or disengagement operation, it is possible to verify whether the operation has been executed correctly by the system.

The invention claimed is:

1. A device for recording data emitted from a motor vehicle control system, comprising:
    a volatile memory;
    a nonvolatile memory;
    a data recording module configured to receive an activation state signal emitted by the motor vehicle control system, and to record the data in a first area of the volatile memory on a rising edge of an activation state signal and in a second area of the volatile memory on a falling edge of the activation state signal; and
    a module configured to manage the recordings based on receipt of the activation state signal, and to activate a recording command on the falling edge of the activation state signal,
    wherein the data recording module is further configured to receive the recording command, and to record the data in the first and second areas of the volatile memory in an area of the nonvolatile memory when the recording command is activated,
    wherein the data recording module configured to record the data and the module configured to manage the recordings are configured to receive an alert signal emitted by the motor vehicle control system, and
    wherein the data recording module is configured to record the data in the first area of the volatile memory on a rising edge of the alert signal, and the module configured to manage the recordings is configured to activate the recording command on the rising edge of the alert signal.

2. The recording device as claimed in claim 1, further comprising a module that manages a counter and that is configured to increment the counter on the rising edge of the alert signal, and to transmit a current value of the counter to the data recording module configured to record the data, the data recording module being configured to record the current value of the counter in the volatile memory.

3. The recording device as claimed in claim 2, further comprising a module configured to record the current value of the counter in the nonvolatile memory on a rising edge of a place on standby command emitted by the motor vehicle control system, and to transmit the recorded current value of the counter to the module that manages the counter on a rising edge of a command to resume by the motor vehicle control system.

4. The recording device as claimed in claim 2, wherein the module that manages the recordings is configured to compare the current value of the counter with a maximum counter threshold, and to activate the recording command and a command to record a saturated counter when the counter is strictly greater than the maximum counter threshold, the data recording module configured to record the data being configured to receive the command to record the saturated counter and to record the current value of the counter and the data in the first area of the volatile memory when the command to record the saturated counter is activated.

5. A method for recording data emitted from a motor vehicle control system, including a volatile memory and a nonvolatile memory, the control system generating at least one activation state signal, the method comprising:
   recording the data in a first area of the volatile memory when the activation state signal is activated and in a second area of the volatile memory when the activation state signal is deactivated,
   recording the data in the first and second areas of the volatile memory in an area of the nonvolatile memory when the activation state signal is deactivated,
   generating at least one alert signal,
   recording the data in the first area of the volatile memory when the alert signal is activated, and
   after said recording when the alert signal is activated, recording the data in the first and second areas of the volatile memory in the area of the nonvolatile memory.

6. The recording method as claimed in claim 5, wherein a counter is incremented when the alert signal is activated, and the data and the counter are recorded in the first area of the volatile memory when the activation state signal is activated.

7. The recording method as claimed in claim 6, further comprising:
   generating a standby command and a resumption command,
   recording a current value of the counter in the area of the nonvolatile memory when the standby command is activated, and
   initializing the counter using the recorded current counter value when the resumption command is activated.

8. The recording method as claimed in claim 6, further comprising:
   comparing a current value of the counter with a maximum counter threshold,
   when the counter is strictly greater than the maximum counter threshold, recording the data and the current counter value in the first area of the volatile memory, and
   after said recording the data and the current counter value in the first area of the volatile memory, recording the data in the first and second areas of the volatile memory in the area of the nonvolatile memory.

* * * * *